US012683706B2

(12) United States Patent
Denton et al.

(10) Patent No.: US 12,683,706 B2
(45) Date of Patent: Jul. 14, 2026

(54) MONITOR CHANNEL FOR MULTIPLE TRANSMISSION CHANNELS

(71) Applicant: Cisco Technology, Inc., San Jose, CA (US)

(72) Inventors: Scott D. Denton, Escondido, CA (US); Joseph J. Balardeta, Encinitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 317 days.

(21) Appl. No.: 18/494,006

(22) Filed: Oct. 25, 2023

(65) Prior Publication Data

US 2025/0141583 A1      May 1, 2025

(51) Int. Cl.
*H04J 14/02*          (2006.01)
*H04Q 11/00*          (2006.01)

(52) U.S. Cl.
CPC ...... *H04J 14/0223* (2013.01); *H04Q 11/0005* (2013.01)

(58) Field of Classification Search
CPC .................................................. H04B 10/5057
See application file for complete search history.

(56) References Cited

U.S. PATENT DOCUMENTS 6,928,242 B1      8/2005   Demsky et al.
2002/0129311 A1   9/2002   Ewen et al.

| | | |
|---|---|---|
| 2006/0245757 A1 | 11/2006 | Elahmadi et al. |
| 2011/0150475 A1 | 6/2011 | Soto et al. |
| 2011/0222850 A1* | 9/2011 | Roberts ................... H04J 14/06 |
| | | 398/38 |
| 2013/0251365 A1* | 9/2013 | Sone ................ H04B 10/07955 |
| | | 398/38 |
| 2019/0327036 A1 | 10/2019 | Gloeckner et al. |
| 2020/0145112 A1* | 5/2020 | Wang ................... H04B 10/532 |
| 2023/0032160 A1 | 2/2023 | Nagarajan |
| 2024/0154699 A1* | 5/2024 | Su ...................... H04B 10/2507 |

* cited by examiner

*Primary Examiner* — Shi K Li

(74) *Attorney, Agent, or Firm* — Patterson + Sheridan, LLP

(57)          ABSTRACT

The present disclosure relates to an optical module and a method of operating the optical module. The optical module includes transmission channels and a monitor channel. The transmission channels produce a plurality of optical signals. Each transmission channel includes an equalizer circuit and a first converter. The equalizer circuit adjusts a received electrical signal to produce an adjusted electrical signal, and the first converter converts the adjusted electrical signal into the optical signal produced by the respective transmission channel. The monitor channel includes an optical multiplexer, a second converter, and a processing circuit. The optical multiplexer selects a first optical signal produced by a first transmission channel of the plurality of transmission channels. The second converter converts the first optical signal into a first electrical signal. The processing circuit adjusts a first equalizer circuit of the first transmission channel. Adjusting the first equalizer circuit adjusts the first optical signal.

18 Claims, 6 Drawing Sheets

102

MONITOR CHANNEL FOR MULTIPLE TRANSMISSION CHANNELS

TECHNICAL FIELD

Embodiments presented in this disclosure generally relate to optical modules. More specifically, embodiments disclosed herein relate to optical modules with a monitor channel for multiple transmission channels.

BACKGROUND

Optical modules may be used to convert electrical signals into optical signals, and vice versa. Each transmission channel in the optical modules may include retiming elements that regenerate signaling and insulate the optical signal from varying electrical signaling environments.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
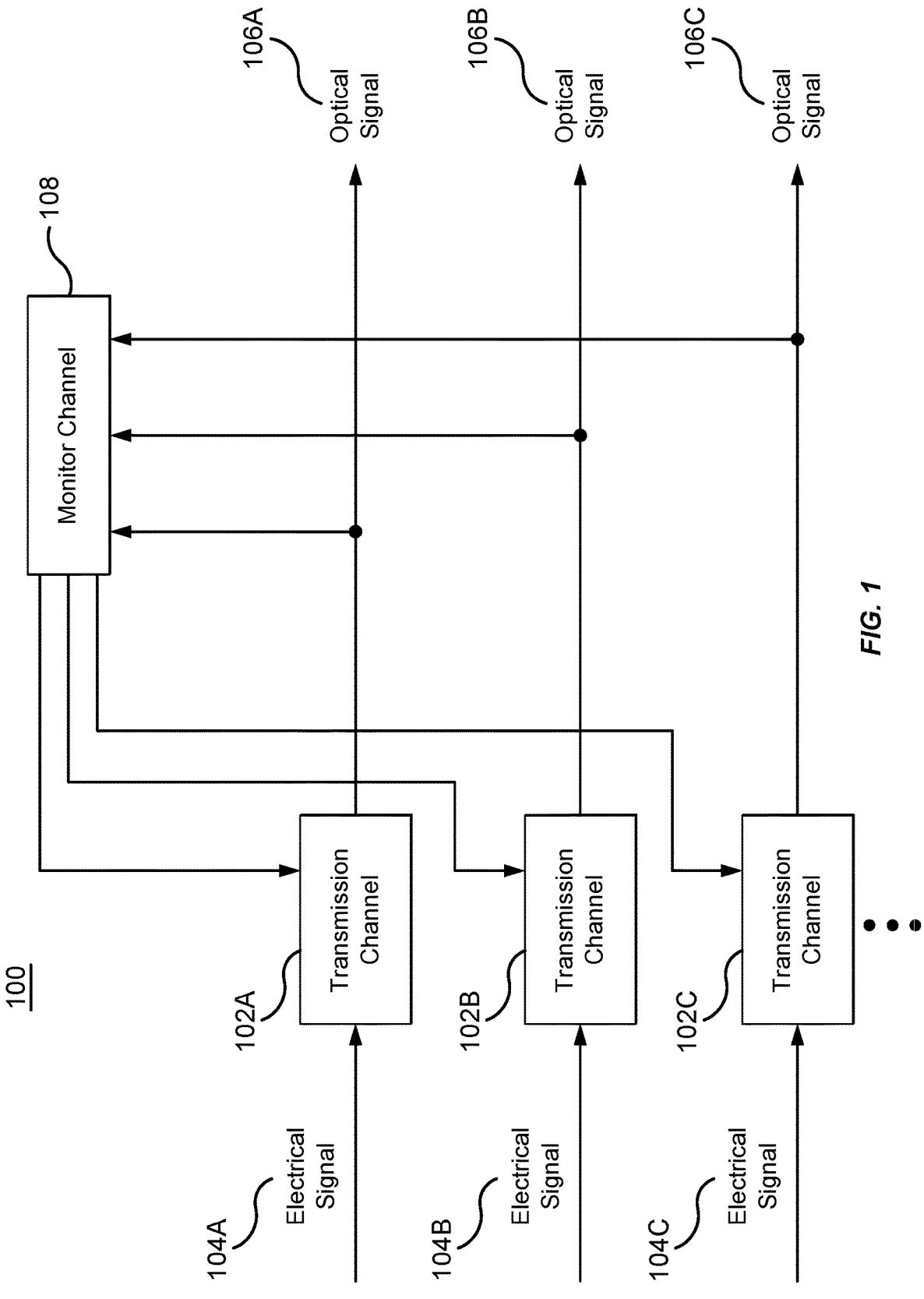
FIG. 1 illustrates an example system.

The present disclosure relates to an optical module and a method of operating the optical module. According to an embodiment, an optical module includes a plurality of transmission channels and a monitor channel. The transmission channels produce a plurality of optical signals. Each transmission channel includes an equalizer circuit and a first converter. The equalizer circuit adjusts a received electrical signal to produce an adjusted electrical signal, and the first converter converts the adjusted electrical signal into the optical signal produced by the respective transmission channel. The monitor channel includes an optical multiplexer, a second converter, and a processing circuit. The optical multiplexer selects a first optical signal produced by a first transmission channel of the plurality of transmission channels. The second converter converts the first optical signal into a first electrical signal. The processing circuit adjusts a first equalizer circuit of the first transmission channel based on the first electrical signal. Adjusting the first equalizer circuit adjusts the first optical signal.

According to another embodiment, a method of operating an optical module includes adjusting, by a first equalizer circuit of a first transmission channel of the optical module, a first electrical signal to produce a first adjusted electrical signal and converting, by a first converter of the first transmission channel, the first adjusted electrical signal into a first optical signal. The method also includes adjusting, by a second equalizer circuit of a second transmission channel of the optical module, a second electrical signal to produce a second adjusted electrical signal and converting, by a second converter of the second transmission channel, the second adjusted electrical signal into a second optical signal. The method further includes selecting, by an optical multiplexer of a monitor channel of the optical module, the first optical signal, converting, by a third converter of the monitor channel, the first optical signal into a third electrical signal, and adjusting, by a processing circuit of the monitor channel, the first equalizer circuit based on the third electrical signal. Adjusting the first equalizer circuit adjusts the first optical signal.

According to another embodiment, an optical module includes a first transmission channel, a second transmission channel, and a monitor channel. The first transmission channel includes a first equalizer circuit and a first converter. The first equalizer circuit adjusts a first electrical signal to produce a first adjusted electrical signal. The first converter converts the first adjusted electrical signal into a first optical signal. The second transmission channel a second equalizer circuit and a second converter. The second equalizer circuit adjusts a second electrical signal to produce a second adjusted electrical signal. The second converter converts the second adjusted electrical signal into a second optical signal. The monitor channel includes an optical multiplexer, a third converter, and a processing circuit. The optical multiplexer selects the first optical signal. The third converter converts the first optical signal into a third electrical signal. The processing circuit adjusts the first equalizer circuit based on the third electrical signal. Adjusting the first equalizer circuit adjusts the first optical signal.

Example Embodiments

An optical module may be used to convert electrical signals into optical signals, and vice versa. Existing optical modules include, in each transmission channel, retiming elements that regenerate signaling and insulate the optical signal from varying electrical signaling environments (e.g., due to manufacturing or temperature variations). These retiming elements may include phase locked loops, digital signal processors, and/or analog-to-digital converters, which may consume a large amount of electrical power and cause delay. Removing these retiming elements, however, may reduce signal quality.

The present disclosure describes an optical module that uses a monitor channel to perform timing recovery and equalization functions to restore signal quality lost due to the removal of retiming functions. The monitor channel may be shared amongst the transmission channels in the optical module. The monitor channel may select each transmission channel in a round robin fashion. When selected, a transmission channel transmits an optical signal to the monitor channel (e.g., using silicon photonics). The monitor channel then analyzes the optical signal to determine how to adjust the equalizers and gain circuits in the selected transmission channel to adjust for variations in the electrical signaling environment. The monitor channel then adjusts the equalizers and gain circuits. The monitor channel may then repeat the process by selecting another transmission channel.

In certain embodiments, the optical module provides several technical advantages. For example, the optical module may have a reduced electrical power consumption relative to existing optical modules, because the optical module shares timing recovery and equalization elements amongst multiple transmission channels. Additionally, retiming elements are removed from the individual transmission channels without a large reduction in signal quality.

FIG. 1 illustrates an example system 100. The system 100 may be an optical module or an optical transceiver. As seen in FIG. 1, the system 100 includes one or more transmission channels 102 and a monitor channel 108. Generally, the monitor channel 108 is shared amongst the transmission channels 102. The monitor channel 108 may perform timing recovery and equalization functions for the transmission channels 102. In certain embodiments, because the monitor channel 108 is shared amongst the transmission channels 102, the system 100 consumes less electrical power than other systems that include retiming and clock recovery elements in each transmission channel.

The system 100 includes multiple transmission channels 102. In the example of FIG. 1, the system 100 includes the transmission channels 102A, 102B, and 102C. Each of the transmission channels 102A, 102B, and 102C may convert electrical signals into optical signals, or vice versa. As seen in FIG. 1, the transmission channel 102A receives the electrical signal 104A. The transmission channel 102A converts the electrical signal 104A into an optical signal 106A. The transmission channel 102B receives the electrical signal 104B. The transmission channel 102B converts the electrical signal 104B into an optical signal 106B. The transmission channel 102C receives the electrical signal 104C. The transmission channel 102C converts the electrical signal 104C into an optical signal 106C. The transmission channels 102A, 102B, and 102C transmit the optical signals 106A, 106B, and 106C, respectively, to other circuit elements or systems (e.g., optical receivers).

Variations (e.g., manufacturing variations or temperature variations) may cause variations or distortions in the electrical signals 104A, 104B, and 104C or in the operation of the transmission channels 102A, 102B, and 102C. As a result, these variations may cause the transmission channels 102A, 102B, and 102C to produce inconsistent optical signals 106A, 106B, and 106C.

The monitor channel 108 includes timing recovery and equalization elements that are shared amongst the transmission channels 102A, 102B, and 102C. Generally, the monitor channel 108 selects each of the transmission channels 102A, 102B, and 102C (e.g., in a round robin fashion). The monitor channel 108 receives the optical signal 106 produced by the selected transmission channel 102. The monitor channel 108 analyzes the optical signal 106 to perform timing recovery and equalization functions for the selected transmission channel 102. For example, the monitor channel 108 may convert the optical signal 106 into an electrical signal. The monitor channel 108 may then analyze the electrical signal to determine how to perform timing recovery and equalization functions to compensate for variations or distortions in the electrical signal. The monitor channel 108 may then adjust coefficients for equalizers or gains for gain circuits in the selected transmission channel 102 to compensate for the variations or distortions in the electrical signal. After making these adjustments, the selected transmission channel 102 may produce a more consistent optical signal 106. The monitor channel 108 may then select another transmission channel 102 and repeat the process for that transmission channel 102. In this manner, the monitor channel 108 performs timing recovery and equalization functions for each of the transmission channels 102 so that the transmission channels 102 need not include their own retiming and clock recovery elements.

In some embodiments, the monitor channel 108 includes a built-in self-test (BIST) circuit that may be used during manufacturing of the system 100. The BIT circuit may generate a BIT sequence, such as, for example, a pseudo random BIT sequence. The monitor channel 108 may convert the BIT sequence into an optical signal, and feed that optical signal into the timing recovery and equalization path. The monitor channel 108 may then convert that optical signal into an electrical signal, and determine the adjustments that should be made to compensate for variations introduced by the BIT sequence. Using the BIT circuit, the monitor channel 108 may determine if the electrical to optical converters and the timing recovery and equalization elements are functioning properly.

In certain embodiments, the system 100 includes receiving channels that receive optical signals and convert those optical signals into electrical signals, and vice versa. The monitor channel 108 performs timing recovery and equalization functions for the receiving channels in a similar manner as for the transmission channels 102. For example, the monitor channel 108 may select each of the receiving channels (e.g., in a round robin fashion). The electrical signal from the selected receiving channel may be converted to an optical signal. The monitor channel 108 may convert that optical signal into an electrical signal and determine variations and distortions in that electrical signal. The monitor channel 108 may then adjust equalizers and gain circuits in the selected receiving channel to compensate for the variations and distortions.

Figure 2:
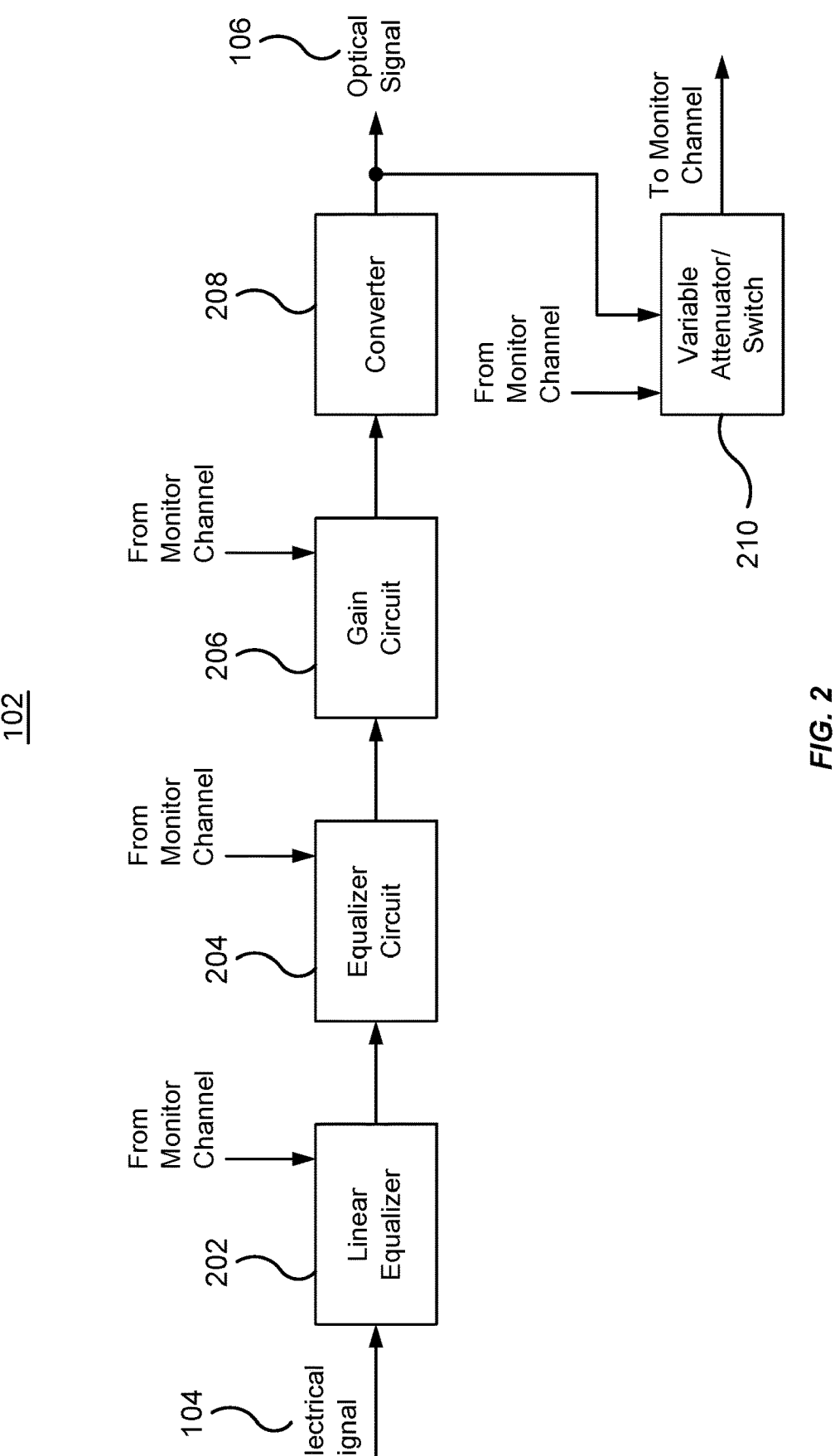
FIG. 2 illustrates an example transmission channel in the system of FIG. 1.

FIG. 2 illustrates an example transmission channel 102 in the system 100 of FIG. 1. As seen in FIG. 2, the transmission channel 102 includes a linear equalizer 202, an equalizer circuit 204, a gain circuit 206, a converter 208, and a variable attenuator or switch 210. Generally, the transmission channel 102 adjusts a received electrical signal 104 and then converts the adjusted electrical signal 104 into the optical signal 106. When the transmission channel 102 is selected by the monitor channel 108, the transmission channel 102 may transmit the optical signal 106 to the monitor channel 108.

The linear equalizer 202, equalizer circuit 204, and gain circuit 206 may adjust the electrical signal 104 prior to converting the electrical signal 104 to the optical signal 106. The linear equalizer 202 may be a continuous time linear equalizer that uses a linear peaking filter to equalize the frequency response of the electrical signal 104. The linear equalizer 202 may reduce distortions resulting from lossy channels. The equalizer circuit 204 may be an adaptive equalizer that adjusts the electrical signal 104 to adapt to time varying properties of the channel. In this manner, the equalizer circuit 204 may compensate for distortions introduced into the electrical signal 104 by the channel. The gain circuit 206 may adjust the amplitude of the electrical signal 104.

The linear equalizer 202, the equalizer circuit 204, and the gain circuit 206 may receive inputs from the monitor channel 108. For example, the monitor channel 108 may adjust the coefficients of the linear equalizer 202 and the equalizer circuit 204 to adjust the equalization functions performed by the linear equalizer 202 and the equalizer circuit 204. Additionally, the monitor channel 108 may adjust the gain applied by the gain circuit 206 to the electrical signal 104. As a result, the monitor channel 108 may adjust the amplitude adjustment performed by the gain circuit 206. In certain embodiments, the monitor channel 108 performs timing recovery and equalization functions by adjusting the coefficients of the linear equalizer 202 and the equalizer circuit 204 or by adjusting the gain of the gain circuit 206.

After the linear equalizer 202, the equalizer circuit 204, and the gain circuit 206 have adjusted the electrical signal 104 (e.g., to compensate for distortions introduced into the electrical signal 104 by the channel), the converter 208 converts the adjusted electrical signal 104 to the optical signal 106. The transmission channel 102 may then transmit the optical signal 106 (e.g., to an optical receiver). The converter 208 may include any suitable components for converting the adjusted electrical signal 104 to the optical signal 106. For example, the converter 208 may include an interferometer, such as a Mach-Zehnder interferometer and/or a modulator that modulates an optical signal with information from the adjusted electrical signal 104 to produce the optical signal 106.

The variable attenuator or switch 210 may normally be in an off state. When the variable attenuator or the switch 210 is in the off state, the variable attenuator or switch 210 blocks the optical signal 106 to the monitor channel 108. When the monitor channel 108 selects the transmission channel 102, the monitor channel 108 may send a control signal to the variable attenuator or switch 210 to turn on the variable attenuator or switch 210. As a result, the variable attenuator or switch 210 directs the optical signal 106 to the monitor channel 108. When the monitor channel 108 has completed analyzing the optical signal 106, the monitor channel 108 may turn off the variable attenuator or switch 210 so that the variable attenuator or switch 210 stops directing the optical signal 106 to the monitor channel 108.

Figure 3:
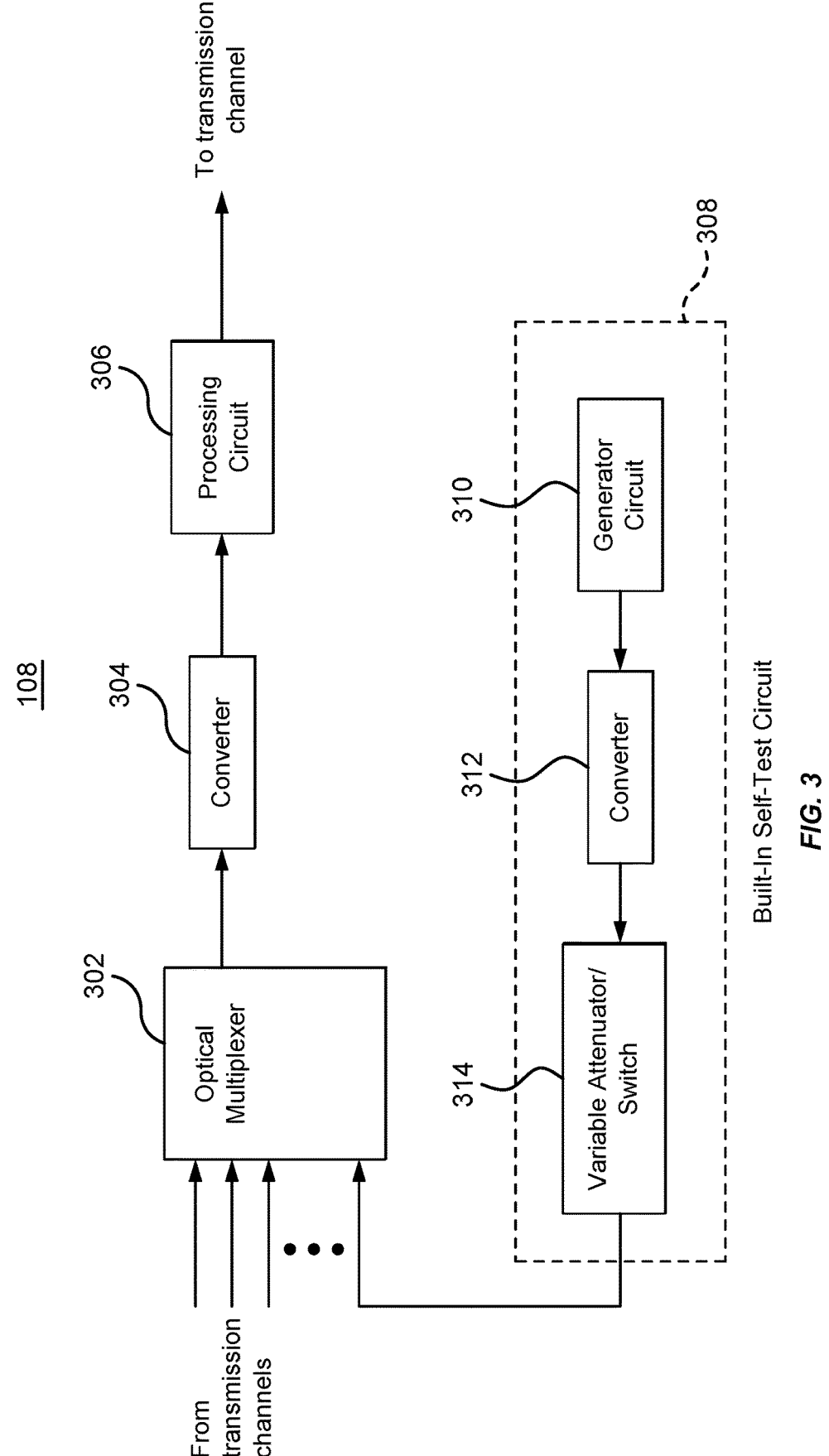
FIG. 3 illustrates an example monitor channel in the system of FIG. 1.

FIG. 3 illustrates an example monitor channel 108 in the system 100 of FIG. 1. As seen in FIG. 3, the monitor channel 108 includes an optical multiplexer 302, a converter 304, a processing circuit 306, and a BIST circuit 308. Generally, the monitor channel 108 performs timing recovery and equalization functions for the transmission channels 102 of the system 100. In particular embodiments, the monitor channel 108 reduces the electrical power consumed by the system 100 by sharing timing recovery and equalization circuitry amongst the transmission channels 102.

The optical multiplexer 302 selects an optical signal 106 from one the transmission channels 102 or from the BIST circuit 308. The optical multiplexer 302 may select or cycle through the transmission channels 102 (e.g., in a round robin fashion). When the optical multiplexer 302 selects a transmission channel 102, the monitor channel 108 may turn on the variable attenuator or switch 210 of that transmission channel 102. The optical multiplexer 302 then selects the optical signal 106 from the selected transmission channel 102 and directs that optical signal 106 to the converter 304.

The converter 304 converts the optical signal 106 into an electrical signal. The converter 304 may include any suitable components for converting optical signals to electrical signals. For example, the converter 304 may include a photodiode or a transimpedance amplifier that converts the optical signal 106 into an electrical signal. The converter 304 then directs the electrical signal to the processing circuit 306. In some embodiments, the converter 304 is matched with the converter 208 of the transmission channel 102. For example, the converter 304 may perform the reciprocal conversion performed by the converter 208. As a result, the converter 304 may produce an electrical signal that represents or matches the adjusted electrical signal received by the converter 208 in the transmission channel 102. The electrical signal may include the same variations or distortions included in the adjusted electrical signal.

The processing circuit 306 performs the timing recovery and equalization functions of the monitor channel 108. For example, the processing circuit 306 may include a phase locked loop, a digital signal processor, or an analog-to-digital converter. The digital signal processor may perform feed forward equalization, decision feedback equalization, maximum likelihood sequence estimation, offset compensation, or clock and data recovery. The analog-to-digital converter may sample the electrical signal from the converter 304. The phase locked loop may generate an alternating signal. In some embodiments, the processing circuit 306 includes a memory and a processor that execute software or firmware to perform the timing recovery and equalization functions of the monitor channel 108. For example, the memory or processor may perform the functions of the phase locked loop, digital signal processor, or analog-to-digital converter.

The processor is any electronic circuitry, including, but not limited to one or a combination of microprocessors, microcontrollers, application specific integrated circuits (ASIC), application specific instruction set processor (ASIP), and/or state machines, that communicatively couples to the memory and controls the operation of the monitor channel 108. The processor may be 8-bit, 16-bit, 32-bit, 64-bit or of any other suitable architecture. The processor may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor may include other hardware that operates software to control and process information. The processor executes software stored on the memory to perform any of the functions described herein. The processor controls the operation and administration of the monitor channel 108 by processing information (e.g., information received from the converter 304 and the memory). The processor is not limited to a single processing device and may encompass multiple processing devices contained in the same device or computer or distributed across multiple devices or computers. The processor is considered to perform a set of functions or actions if the multiple processing devices collectively perform the set of functions or actions, even if different processing devices perform different functions or actions in the set.

The memory may store, either permanently or temporarily, data, operational software, or other information for the processor. The memory may include any one or a combination of volatile or non-volatile local or remote devices suitable for storing information. For example, the memory may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory, a disk, a CD, or a flash drive. In particular embodiments, the software may include an application executable by the processor to perform one or more of the functions described herein. The memory is not limited to a single memory and may encompass multiple memories contained in the same device or computer or distributed across multiple devices or computers. The memory is considered to store a set of data, operational software, or information if the multiple memories collectively store the set of data, operational software, or information, even if different memories store different portions of the data, operational software, or information in the set.

When the converter 304 converts the optical signal 106 into an electrical signal, the electrical signal may represent or resemble the adjusted electrical signal 104 received by the converter 208 in the transmission channel 102. The processing circuit 306 may analyze the electrical signal to determine variations or distortions introduced into the electrical signal by the channel. The processing circuit 306 may perform the timing recovery and equalization functions to determine the variations or distortions in the electrical signal. The processing circuit 306 may also determine adjustments that should be made to the linear equalizer 202, the equalizer circuit 204, or the gain circuit 206 of the transmission channel 102 to compensate for the variations or distortions in the electrical signal. For example, the processing circuit 306 may determine adjustments to the coefficients of the linear equalizer 202 or the equalizer circuit 204. The processing circuit 306 may also determine adjustments to the gain applied by the gain circuit 206. The processing circuit 306 may then make these adjustments to the linear equalizer 202, equalizer circuit 204, or gain circuit 206 to compensate for the variations or distortions in the electrical signal. The processing circuit 306 may communicate the adjustments to the linear equalizer 202, equalizer circuit 204, and gain circuit 206 to make these adjustments. In this manner, the monitor channel 108 adjusts the transmission channel 102 to compensate for variations or distortions in the electrical signal 104 handled by the transmission channel 102.

The monitor channel 108 may then select another transmission channel 102. The optical multiplexer 302 de-selects the optical signal 106 from the previously selected transmission channel 102 and selects the optical signal 106 from the newly selected transmission channel 102. The monitor channel 108 may covert the optical signal 106 into an electrical signal and determine the adjustments to be made to compensate for variations or distortions in the electrical signal. The monitor channel 108 may then communicate the adjustments to the linear equalizer 202, equalizer circuit 204, or gain circuit 206 of the newly selected transmission channel 102 to adjust the linear equalizer 202, equalizer circuit 204, or gain circuit 206 of the newly selected transmission channel 102.

The BIST circuit 308 may be used during manufacture of the monitor channel 108 to determine whether the components of the monitor channel 108 are functioning properly. As seen in FIG. 3, the BIST circuit 308 includes a generator circuit 310, a converter 312, and a variable attenuator or switch 314. The BIST circuit 308 may be enabled or activated during manufacturing to test the components of the monitor channel 108.

When enabled or activated, the generator circuit 310 produces a bit sequence (e.g., a pseudo random bit sequence) for testing purposes. The bit sequence may represent a test electrical signal with simulated variations or distortions. The generator circuit 310 may direct the bit sequence to the converter 312. The converter 312 converts the bit sequence from the generator circuit 310 into an optical signal. For example, the converter 312 may include a modulator that modulates an optical signal with information from the bit sequence. The converter 312 may then direct the modulated optical signal to the variable attenuator or switch 314. The variable attenuator or switch 314 may be turned off when the BIST circuit 308 is not enabled. When the BIST circuit 308 is enabled, the variable attenuator or switch 314 may be turned on such that the variable attenuator or switch 314 directs the optical signal from the converter 312 to the optical multiplexer 302 of the monitor channel 108.

The optical multiplexer 302 may select the optical signal from the BIST circuit 308 and direct the optical signal to the converter 304. The converter 304 converts the optical signal into an electrical signal for the processing circuit 306. The processing circuit 306 may then determine the variations or distortions in the electrical signal and the adjustments that should be made to compensate for these variations. These adjustments output by the processing circuit 306 may be analyzed to determine whether the processing circuit 306 determined the correct adjustments for compensating the variations or distortions simulated by the generator circuit 310. If the adjustments compensate for the variations or distortions, then the processing circuit 306 may be determined to be functioning properly. If the adjustments do not compensate for the variations or distortions, then the processing circuit 306 may be adjusted so that the processing circuit 306 determines the appropriate adjustments in subsequent test iterations. In some instances, the testing may reveal that the processing circuit 306 (or other components of the monitor channel 108) include a defect that prevents the monitor channel 108 from functioning properly. In response, the monitor channel 108 or the processing circuit 306 may be discarded.

Figure 4:
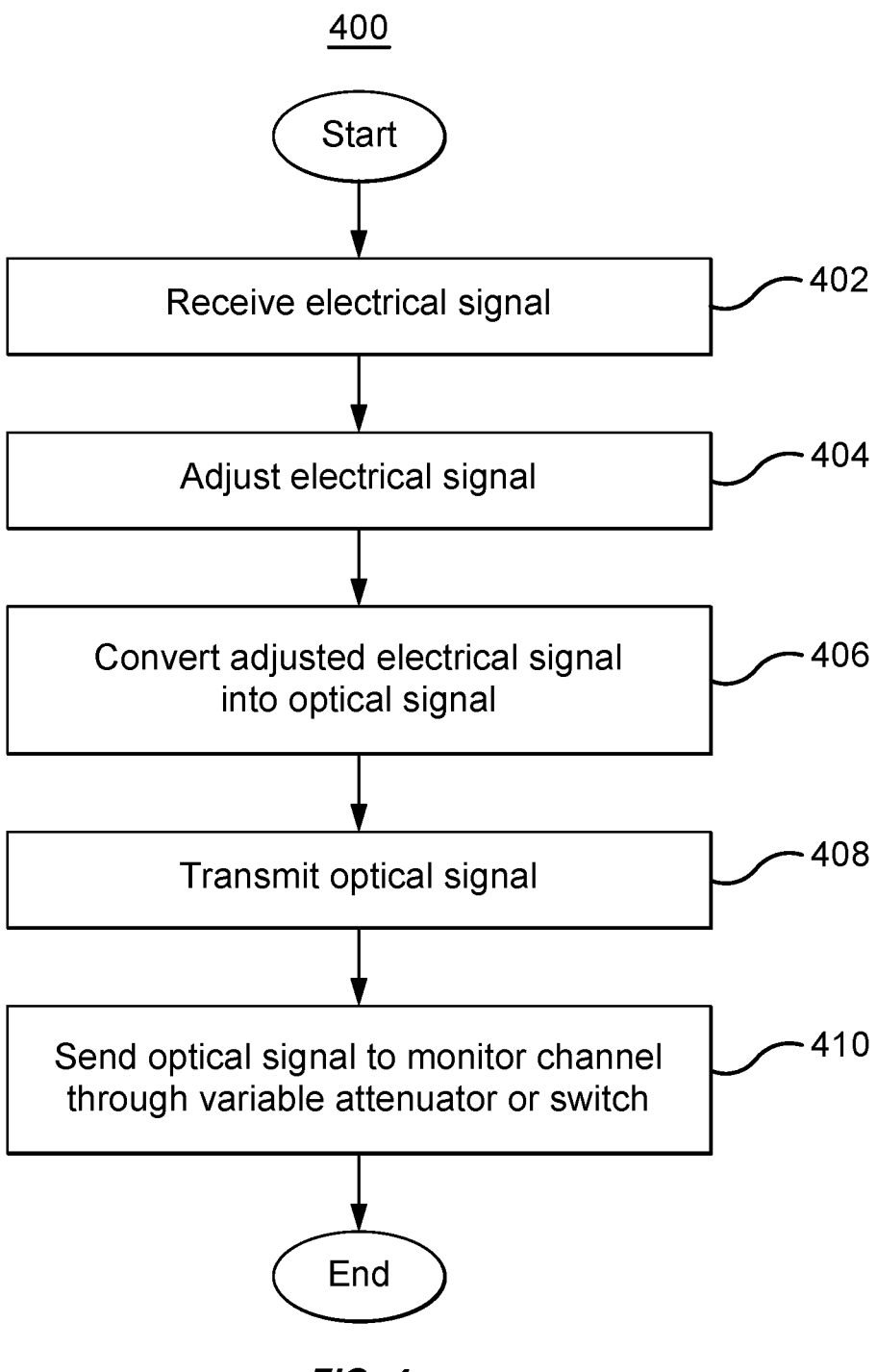
FIG. 4 is a flowchart of an example method performed in the system of FIG. 1.

FIG. 4 is a flowchart of an example method 400 performed in the system 100 of FIG. 1. In particular embodiments, the transmission channel 102 performs the method 400. By performing the method 400, the transmission channel 102 generates and communicates an optical signal 106 to the monitor channel 108.

In block 402, the transmission channel 102 receives an electrical signal 104. The electrical signal 104 may include variations or distortions introduced by the channel used to communicate the electrical signal 104 to the transmission channel 102. In block 404, the transmission channel 102 adjusts the electrical signal 104. For example, the transmission channel 102 may include a linear equalizer 202, an equalizer circuit 204, and a gain circuit 206 that adjusts the electrical signal 104. The linear equalizer 202 may equalize the frequency response of the electrical signal 104. The equalizer circuit 204 may compensate for distortions introduced by the channel. The gain circuit 206 may adjust an amplitude of the electrical signal 104. In block 406, the transmission channel 102 converts the adjusted electrical signal 104 into an optical signal 106. The converter 208 of the transmission channel 102 may perform this conversion. For example, the converter 208 may include a modulator that modulates an optical signal with information from the adjusted electrical signal to produce the optical signal 106.

In block 408, the transmission channel 102 transmits the optical signal 106 (e.g., to an optical receiver). If the monitor channel 108 has selected the transmission channel 102, then in block 410, the transmission channel 102 sends the optical signal 106 to the monitor channel 108 through the variable attenuator or switch 210. The variable attenuator or switch 210 may be turned off until the monitor channel 108 selects the transmission channel 102. When the monitor channel 108 selects the transmission channel 102, the variable attenuator or switch 210 may turn on to direct the optical signal 106 to the monitor channel 108.

Figure 5:
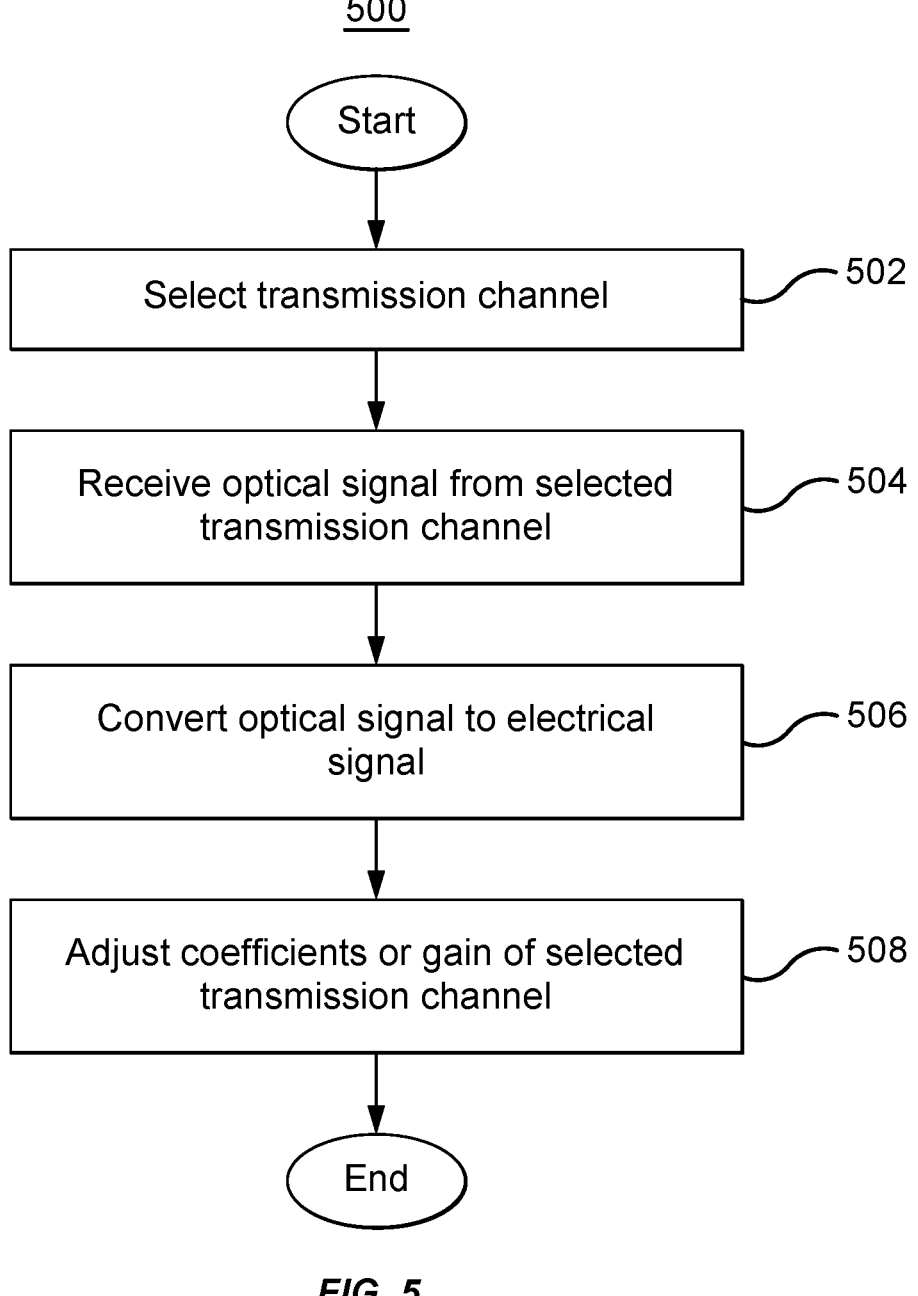
FIG. 5 is a flowchart of an example method performed in the system of FIG. 1.

FIG. 5 is a flowchart of an example method 500 performed in the system 100 of FIG. 1. In particular embodiments, the monitor channel 108 performs the method 500. By performing the method 500, the monitor channel 108 compensates for variations or distortions in the electrical signal 104 introduced by the channel.

In block 502, the monitor channel 108 selects a transmission channel 102. The monitor channel 108 may select or cycle through each of the transmission channels 102 in the system 100 (e.g., in a round robin fashion). In block 504, the monitor channel 108 receives the optical signal 106 from the selected transmission channel 102. For example, the selected transmission channel 102 may direct the optical signal 106 through the variable attenuator or switch 210 of that transmission channel 102 to the monitor channel 108. The optical multiplexer 302 in the monitor channel 108 may then select the optical signal 106 from the transmission channel 102. In block 506, the monitor channel 108 converts the optical signal 106 into an electrical signal. The converter 304 in the monitor channel 108 may perform this conversion. For example, the converter 304 may include a photodiode or a transimpedance amplifier that converts the optical signal 106 into an electrical signal. The electrical signal may represent or resemble the adjusted electrical signal in the selected transmission channel 102. The converter 304 then directs the electrical signal to the processing circuit 306.

The processing circuit 306 analyzes the electrical signal to determine variations or distortions in the electrical signal introduced by the channel. The processing circuit 306 may also determine adjustments that should be made to the transmission channel 102 to compensate for these variations or distortions. In block 508, the monitor channel 108 adjusts coefficients or gain of the selected transmission channel 102. The processing circuit 306 may communicate adjusted coefficients to the linear equalizer 202 or the equalizer circuit 204 of the selected transmission channel 102. The processing circuit 306 may also communicate a gain to the gain circuit 206 of the selected transmission channel 102. The selected transmission channel 102 may then apply these adjustments to the linear equalizer 202, the equalizer circuit 204, and the gain circuit 206 to compensate for the variations or distortions in the electrical signal.

Figure 6:
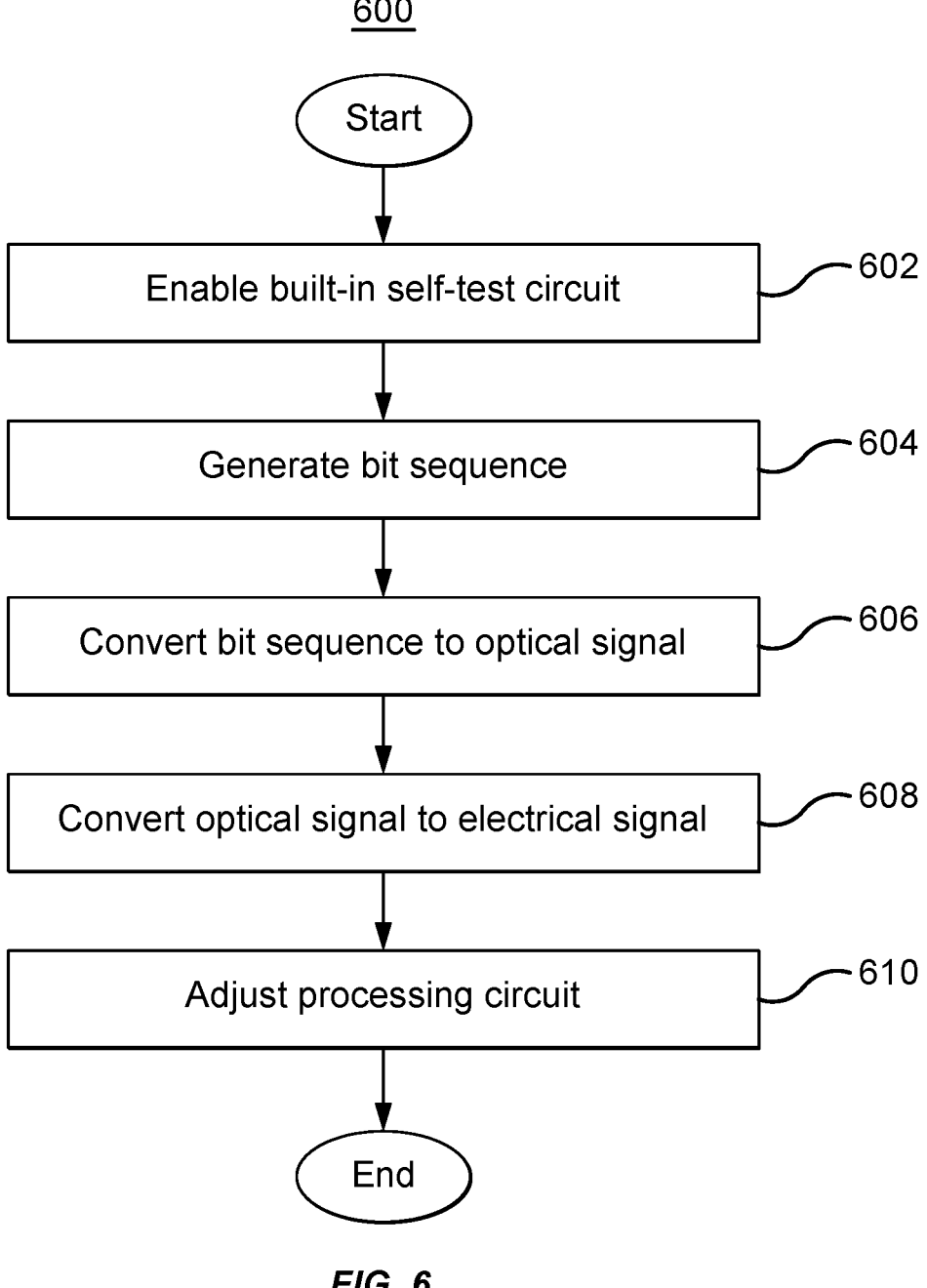
FIG. 6 is a flowchart of an example method performed in the system of FIG. 1.

FIG. 6 is a flowchart of an example method 600 performed in the system 100 of FIG. 1. In particular embodiments, the monitor channel 108 may perform the method 600. By performing the method 600, the monitor channel 108 uses the BIST circuit 308 to test whether the monitor channel 108 is functioning properly.

In block 602, the monitor channel 108 enables the BIST circuit 308. The monitor channel 108 may enable the BIST circuit 308 during manufacture of the monitor channel 108 or the system 100. In block 604, the generator circuit 310 of the BIST circuit 308 generates a bit sequence. The bit sequence may be a pseudo-random bit sequence that represents an electrical signal. The bit sequence may include variations or distortions simulated by the generator circuit 310.

In block 606, the converter 312 of the BIST circuit 308 converts the bit sequence into an optical signal. For example, the converter 312 may include a modulator that modulates an optical signal with information in the bit sequence to produce the optical signal. The converter 312 then directs the optical signal to the variable attenuator or switch 314. When the BIST circuit 308 is enabled, the variable attenuator or switch 314 may be turned on so that the variable attenuator or switch 314 directs the optical signal to the optical multiplexer 302. The optical multiplexer 302 selects the optical signal from the variable attenuator or switch 314 and directs the optical signal to the converter 304. In block 608, the converter 304 converts the optical signal to an electrical signal. The converter 304 then directs the electrical signal to the processing circuit 306.

In block 610, the processing circuit 306 analyzes the electrical signal from the converter 304 to determine the variations or distortions in the electrical signal. The processing circuit 306 may then output adjustments that should be made to compensate for the distortions or variations in the electrical signal. These adjustments may be analyzed to determine whether the processing circuit 306 is functioning properly. If the processing circuit 306 is not functioning properly, then adjustments may be made to the processing circuit 306 so that the processing circuit 306 makes the appropriate adjustments for the variations or distortions. In this manner, the BIST circuit 308 may be used during manufacture to ensure that the processing circuit 306 is functioning properly.

In summary, the system 100 (which may be an optical module) uses a monitor channel 108 to perform some timing recovery and equalization functions. The monitor channel 108 may be shared amongst the transmission channels 102 in the system 100. The monitor channel 108 may select each transmission channel (e.g., in a round robin fashion). When selected, a transmission channel 102 transmits an optical signal 106 to the monitor channel 108 (e.g., using silicon photonics). The monitor channel 108 then analyzes the optical signal 106 to determine how to adjust the equalizers and gain circuits in the selected transmission channel 102 to adjust for variations or distortions in the electrical signaling environment. The monitor channel 108 then adjusts the equalizers and gain circuits. The monitor channel 108 may then repeat the process by selecting another transmission channel 102.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. An optical module comprising:
   a plurality of transmission channels arranged to produce a plurality of optical signals, each transmission channel of the plurality of transmission channels comprising:
      an equalizer circuit arranged to adjust a received electrical signal to produce an adjusted electrical signal; and
      a first converter arranged to convert the adjusted electrical signal into the optical signal produced by the respective transmission channel;
   a monitor channel comprising:
      an optical multiplexer arranged to select a first optical signal produced by a first transmission channel of the plurality of transmission channels, wherein the first transmission channel further comprises at least one of a variable attenuator or a switch arranged to direct the first optical signal to the monitor channel when the optical multiplexer selects the first optical signal;
      a second converter arranged to convert the first optical signal into a first electrical signal; and
      a processing circuit arranged to adjust a first equalizer circuit of the first transmission channel based on the first electrical signal, wherein adjusting the first equalizer circuit adjusts the first optical signal.

2. The optical module of claim 1, wherein the first equalizer circuit of the first transmission channel comprises:
   a linear equalizer arranged to compensate for losses in a second electrical signal received by the first equalizer circuit; and
   a gain circuit arranged to adjust an amplitude of the second electrical signal, wherein adjusting the first equalizer circuit comprises adjusting the linear equalizer and the gain circuit.

3. The optical module of claim 1, wherein the optical multiplexer is further arranged to de-select the first optical signal and to select a second optical signal produced by a second transmission channel of the plurality of transmission channels.

4. The optical module of claim 3, wherein the processing circuit is further arranged to adjust a second equalizer circuit of the second transmission channel when the optical multiplexer selects the second optical signal.

5. The optical module of claim 1, wherein the monitor channel further comprises a built-in self-test (BIST) circuit, wherein when the BIST circuit is enabled:
   the optical multiplexer selects a second optical signal produced by the BIST circuit; and
   the second converter converts the second optical signal into a second electrical signal.

6. The optical module of claim 5, wherein the BIST circuit comprises:

a generator circuit arranged to generate a bit sequence; and a third converter arranged to convert the bit sequence into the second optical signal.

7. The optical module of claim 1, wherein the first converter and the second converter are matched.

8. The optical module of claim 1, wherein the optical multiplexer is arranged to select the first optical signal and other optical signals produced by other transmission channels of the plurality of transmission channels in a round robin fashion.

9. The optical module of claim 1, wherein the processing circuit samples the first electrical signal.

10. A method of operating an optical module comprising:

adjusting, by a first equalizer circuit of a first transmission channel of the optical module, a first electrical signal to produce a first adjusted electrical signal;

converting, by a first converter of the first transmission channel, the first adjusted electrical signal into a first optical signal;

adjusting, by a second equalizer circuit of a second transmission channel of the optical module, a second electrical signal to produce a second adjusted electrical signal;

converting, by a second converter of the second transmission channel, the second adjusted electrical signal into a second optical signal;

selecting, by an optical multiplexer of a monitor channel of the optical module, the first optical signal;

converting, by a third converter of the monitor channel, the first optical signal into a third electrical signal;

when a built-in self-test (BIST) circuit of the monitor channel is enabled:

selecting, by the optical multiplexer, a third optical signal produced by the BIST circuit; and converting, by the third converter, the third optical signal into a fourth electrical signal; and adjusting, by a processing circuit of the monitor channel, the first equalizer circuit based on the third electrical signal, wherein adjusting the first equalizer circuit adjusts the first optical signal.

11. The method of claim 10, wherein adjusting the first electrical signal comprises:

compensating, by a linear equalizer of the first equalizer circuit, for losses in the first electrical signal; and adjusting, by a gain circuit of the first equalizer circuit, an amplitude of the first electrical signal, wherein adjusting the first equalizer circuit comprises adjusting the linear equalizer and the gain circuit.

12. The method of claim 10, further comprising directing, by at least one of a variable attenuator or a switch of the first transmission channel, the first optical signal to the monitor channel when the optical multiplexer selects the first optical signal.

13. The method of claim 10, further comprising:

de-selecting, by the optical multiplexer, the first optical signal; and selecting, by the optical multiplexer, the second optical signal.

14. The method of claim 13, further comprising adjusting, by the processing circuit, a second equalizer circuit of the second transmission channel when the optical multiplexer selects the second optical signal.

15. The method of claim 10, further comprising:

generating, by a generator circuit of the BIST circuit, a bit sequence; and converting, by a fourth converter of the BIST circuit, the bit sequence into the third optical signal.

16. The method of claim 10, wherein the first converter and the second converter are matched.

17. The method of claim 10, further comprising sampling, by the processing circuit, the first electrical signal.

18. An optical module comprising:

a first transmission channel comprising:

a first equalizer circuit arranged to adjust a first electrical signal to produce a first adjusted electrical signal; and a first converter arranged to convert the first adjusted electrical signal into a first optical signal;

a second transmission channel comprising:

a second equalizer circuit arranged to adjust a second electrical signal to produce a second adjusted electrical signal; and a second converter arranged to convert the second adjusted electrical signal into a second optical signal; and a monitor channel comprising:

an optical multiplexer arranged to select the first optical signal;

a third converter arranged to convert the first optical signal into a third electrical signal;

a built-in self-test (BIST) circuit comprising (i) a generator circuit arranged to generate a bit sequence and (ii) a fourth converter arranged to convert the bit sequence into a third optical signal, wherein when the BIST circuit is enabled:

the optical multiplexer selects the third optical signal; and the third converter converts the third optical signal into a fourth electrical signal; and a processing circuit arranged to adjust the first equalizer circuit based on the third electrical signal, wherein adjusting the first equalizer circuit adjusts the first optical signal.

* * * * *